(12) United States Patent
Tanabe et al.

(10) Patent No.: US 10,965,222 B2
(45) Date of Patent: Mar. 30, 2021

(54) POWER SUPPLY

(71) Applicant: FANUC CORPORATION, Yamanashi (JP)

(72) Inventors: Yoshikiyo Tanabe, Yamanashi (JP); Katsuhiro Watanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/717,922

(22) Filed: Dec. 17, 2019

(65) Prior Publication Data

US 2020/0220482 A1 Jul. 9, 2020

(30) Foreign Application Priority Data

Jan. 9, 2019 (JP) .............................. JP2019-001634

(51) Int. Cl.
*H02M 7/00* (2006.01)
*H02M 7/797* (2006.01)
*H02M 7/539* (2006.01)
*H02M 7/06* (2006.01)
*H02M 7/48* (2007.01)

(52) U.S. Cl.
CPC ............. *H02M 7/797* (2013.01); *H02M 7/06* (2013.01); *H02M 7/539* (2013.01); *H02M 2007/4803* (2013.01)

(58) Field of Classification Search
CPC ........ H02M 7/797; H02M 7/539; H02M 7/06; H02M 2007/4803; H02M 3/1584; H02M 2001/123

See application file for complete search history.

(56) References Cited

U.S. PATENT DOCUMENTS 9,318,976 B1* 4/2016 Wei .................... H02P 27/08
2018/0123498 A1* 5/2018 Tanabe ................ H02P 29/025

FOREIGN PATENT DOCUMENTS

JP 2018-074794 A 5/2018

* cited by examiner

*Primary Examiner* — Adolf D Berhane
*Assistant Examiner* — Afework S Demisse
(74) *Attorney, Agent, or Firm* — Studebaker & Brackett PC (57) ABSTRACT

A power supply includes: a rectifier circuit which has a plurality of rectifier switching elements, and separately extracts a positive voltage and a negative voltage for every phase from a primary power source of three-phase alternating current, respectively; a smoothing circuit which has a pair of smoothing capacitors connected in series to each other to be charged by the rectifier circuit, and a plurality of smoothing inductors respectively arranged between the rectifier circuit and the smoothing capacitors; a inverter circuit which has a plurality of inverter switching elements and inverts output of the smoothing circuit into alternating current; and a control circuit which controls switching of the plurality of rectifier switching elements so that output voltage of the smoothing circuit becomes a desired voltage, and electrical current flowing to each phase of the rectifier circuit becomes a desired electrical current.

6 Claims, 5 Drawing Sheets

POWER SUPPLY

This application is based on and claims the benefit of priority from Japanese Patent Application No. 2019-001634, filed on 9 Jan. 2019, the content of which is incorporated herein by reference.

BACKGROUND OF THE INVENTION

Field of the Invention

The present invention relates to a power supply.

Related Art

Conventionally, devices using an electric motor that is driven by an AC power source in an industrial application (industrial machine) have been widely used. The voltage of the AC power source which can be utilized by the user, i.e. voltage of on-premise electrical distribution system, may differ according to the user. Generally, in Japan, although there are many cases where on-premise electrical distribution is done in three-phase alternating current at 200 V AC, there are many examples in other countries where an electrical distribution system on the order of 380 V AC to 480 V AC is used. In addition, there are also cases where voltages of the on-premise electrical distribution system differ according to the configuration of the power receiving equipment, even in the same country.

For example, with an industrial robot or the like, various sizes, number of axes, and system configurations exist, and the power source voltages which can be utilized by the user also vary, and changing the layout of devices to match specific voltages is not easy. In addition, when changing the layout of devices for every voltage, inconveniences arise in that the maintenance also becomes complicated. For this reason, in the case of the voltage of the power source which can be utilized by the user differing from the voltage of the existing devices, it is often handled by installing a voltage transformer between the power source and device. However, when using a voltage transformer, the size and weight of the device increase, as well as the cost increasing.

In addition, with an industrial robot or the like, in order to drive servomotors, for example, a power supply which rectifies AC to DC, and then inverse converts to AC of a desired frequency has been utilized, as disclosed in Patent Document 1. In this case, it has been considered to obtain the optimum output voltage to the motor irrespective of the power supply voltage, by transforming the direct current. In other words, if adding a chopper circuit to the DC portion of the power supply disclosed in Patent Document 1, it would be possible to adjust the outputted AC voltage.

Patent Document 1: Japanese Unexamined Patent Application, Publication No. 2018-74794

SUMMARY OF THE INVENTION

An AC power source which can control a motor for 200 V AC is obtained by converting the voltage by the chopper circuit on a 380 V to 480 V AC power source which is grounded to neutral that tends to be used overseas. In this case, when re-converting to three-phase alternating current by an inverter circuit, the neutral point of the outputted three-phase AC power source will become a different potential from the earth potential.

If the neutral point of the outputted alternating current greatly differs from the earth potential, a high-dielectric voltage relative to earth is required in the load circuits such as servomotors, and it may not be possible to use due to dielectric voltage insufficiency. In addition, if the neutral point potential greatly differs from the earth potential, the switching noise will increase and the risk of malfunction will grow.

In addition, with a power supply for driving servomotors, since electric current flows to a high capacity capacitor, a large peak current including high harmonics flows during servomotor acceleration, and an increase in capacity of the facility power source becomes necessary. As countermeasures, technology for a power factor improvement and suppressing peak current are being developed; however, since these lead to a cost increase and size increase in order to realize this, it cannot be easily applied.

Therefore, the present invention has an object of providing a power supply which can transform voltage without using a transformer, and can output alternating current of any frequency.

A power supply according to a first aspect of the present invention (e.g., the power supply 1, 1a, 1b, 1c is described later) includes: a rectifier circuit. (e.g., the rectifier circuit 2, 2a described later) which has a plurality of rectifier switching elements (e.g., the rectifier switching elements T11, T12, T13, T14, T15, T16 described later), and separately extracts a positive voltage and a negative voltage for every phase from a primary power source of three-phase alternating current, respectively; a smoothing circuit (e.g., the smoothing circuit 3, 3a, 3b, 3c described later) which has a pair of smoothing capacitors (e.g., the smoothing capacitor C1, C2 described later) connected in series to each other to be charged by the rectifier circuit, and a plurality of smoothing inductors (e.g., the smoothing inductors L1, L2, L3, L4, L5, L6, L7, L8 described later) respectively arranged between the rectifier circuit and the smoothing capacitors; a inverter circuit (e.g., the inverter circuit 4 described later) which has a plurality of inverter switching elements (e.g., the inverter switching elements T21, T22, T23, T24, T25, T26 described later) and inverts output of the smoothing circuit into alternating current; and a control circuit (e.g., the control circuit 5, 5a, 5b, 5c described later) which controls switching of the plurality of rectifier switching elements so that output voltage of the smoothing circuit becomes a desired voltage, and electrical current flowing to each phase of the rectifier circuit becomes a desired electrical current.

According to a second aspect of the present invention, the power supply as described in the first aspect, the smoothing inductors may be respectively arranged between positive and negative outputs of each phase of the rectifier circuit and the smoothing capacitor.

According to a third aspect of the present invention, in the power supply as described in the first or second aspect, the control circuit may control electrical current flowing to each phase of the rectifier circuit, so that potential of an intermediate point of the pair of smoothing capacitors becomes a predetermined potential or a potential within a predetermined range.

According to a fourth aspect of the present invention, in the power supply as described in any one of the first to third aspects, the control circuit may control electrical current flowing to each phase of the rectifier circuit, so as to improve a power factor of each phase of the rectifier circuit, or suppress peak current.

According to a fifth aspect of the present invention, in the power supply as described in any one of the first to fourth aspects, the rectifier circuit may further include a plurality of regenerative switching elements (e.g., the regenerative switching elements T31, T32, T33, T34, T35, T36 described later) provided to correspond to the rectifier switching elements, and which can flow electrical current in an opposite direction; the smoothing circuit may further include a plurality of boosting switching elements (e.g., the boosting switching elements T41, T42, T43, T44, T45, T46 described later) which respectively connect a side of the rectifier circuit of the smoothing inductor and an intermediate point of the pair of smoothing capacitors; the inverter circuit may be configured so as to be able to convert alternating current voltage supplied from an output side into direct current voltage; and the control circuit may control the boosting switching element so that voltage supplied from the smoothing circuit to the rectifier circuit becomes equal to a voltage peak value of a primary power source, and controls the regenerative switching element so as to extract voltage synchronized with the primary power source from the voltage of the smoothing circuit and supply to the primary power source.

According to a sixth aspect of the present invention, the power supply as described in any one of the first to fifth aspects may further include an insulation deterioration detecting circuit (6) which grounds the intermediate point of the pair of smoothing capacitors via a detection switch and a detection resistor.

According to the present invention, it is possible to provide a power supply which can transform voltage without using a transformer, and can output alternating current of any frequency.

DETAILED DESCRIPTION OF THE INVENTION

Figure 1:
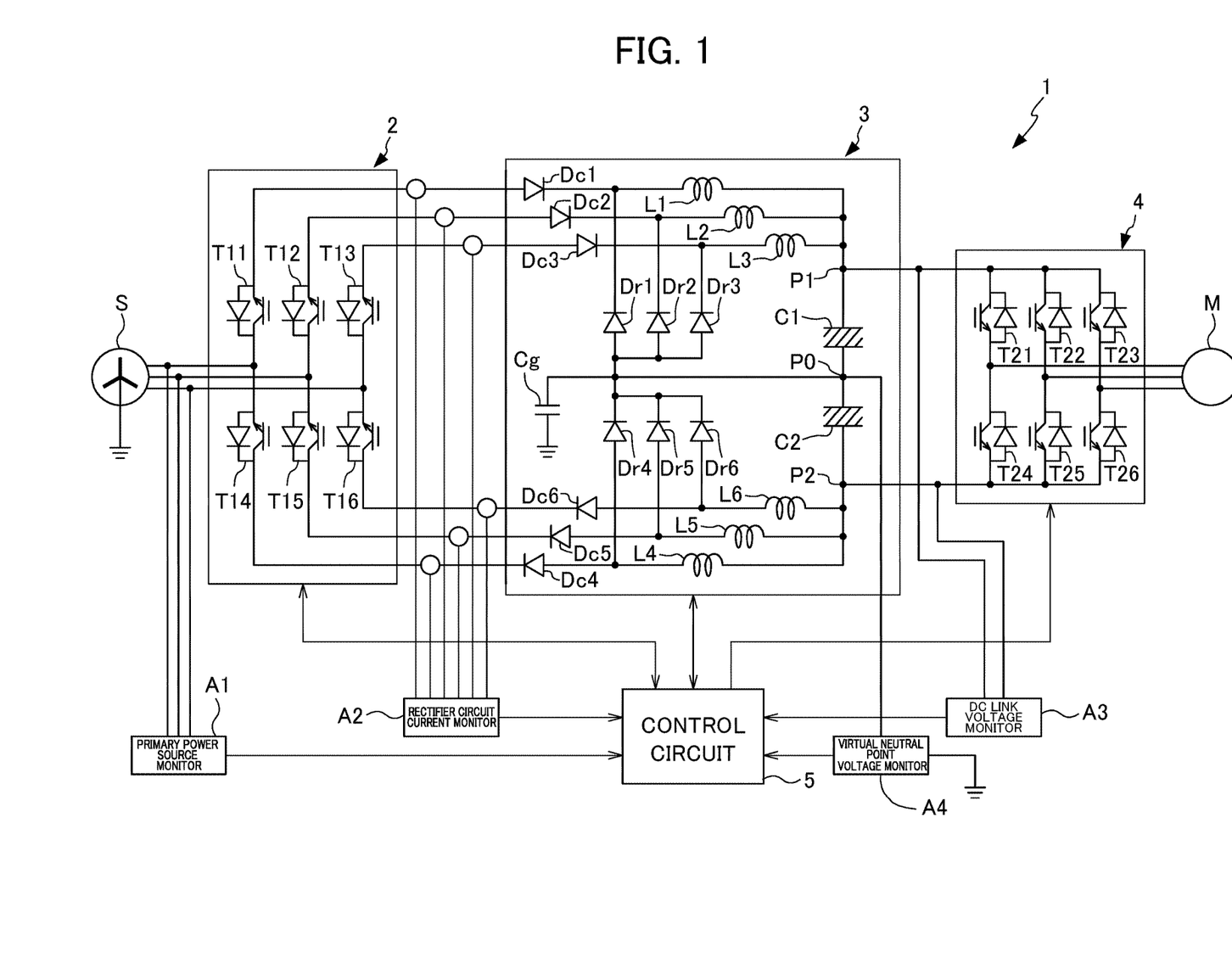
FIG. 1 is a circuit diagram showing the configuration of a power supply according to an embodiment of the present invention.

Hereinafter, embodiments of the present invention will be explained while referencing the drawings. FIG. 1 is a circuit diagram showing the configuration of a power supply 1 according to an embodiment of the present invention.

The power supply 1 is a device which converts three-phase alternating current supplied from a primary power source (AC power source) S into three-phase alternating current of different voltage and frequency, and supplies this to a load (motor M in the present embodiment). In more detail, the power supply 1 is connected to the primary power source S which is neutral point grounded and has a voltage of at least the rated vbltage of the motor M, converts the three-phase alternating current of the primary power source S into three-phase alternating current having voltage equal to the rated voltage of the motor M, and having frequency equal to the frequency set by external equipment or by the user, and supplies to the motor M.

The power supply 1 includes: a rectifier circuit 2 which separately extracts the positive voltage and negative voltage for every phase from the primary power source, respectively; a smoothing circuit 3 which obtains stable direct current by smoothing the electric current supplied from the rectifier circuit 2; a inverter circuit 4 which outputs alternating current of a desired frequency by inverting the output of the smoothing circuit 3 to alternating current; and a control circuit 5 which controls the rectifier circuit 2 and inverter circuit 4.

The rectifier circuit 2 has a plurality of rectifier switching elements (rectifier switching element T11 which extracts positive voltage of the first phase; rectifier switching element T12 which extracts positive voltage of the second phase; rectifier switching element T13 which extracts positive voltage of the third phase; rectifier switching element T14 which extracts negative voltage of the first phase; rectifier switching element T15 which extracts negative voltage of the second phase; rectifier switching element T16 which extracts negative voltage of the third phase).

The rectifier switching elements T11, T12, T13, T14, T15 and T16 are configured by semiconductor switching elements such as the FET illustrated, and the ON/OFF state is controlled by the control circuit 5 described later.

The smoothing circuit 3 includes: a pair of smoothing capacitors having equal capacity connected in series to each other to be charged by the rectifier circuit 2 (smoothing capacitor C1 charged by positive voltage; smoothing capacitor C2 charged by negative voltage); a grounding capacitor Cg which grounds the intermediate point of the pair of smoothing capacitors; a plurality of smoothing inductors respectively arranged between the positive and negative output of each phase of the rectifier circuit 2 and the smoothing capacitor (smoothing inductor L1 to which positive voltage of the first phase is applied; smoothing inductor L2 to which positive voltage of the second phase is applied; smoothing inductor L3 to which positive voltage of the third phase is applied; smoothing inductor L4 to which negative voltage of the first phase is applied; smoothing inductor L5 to which negative voltage of the second phase is applied; smoothing inductor L6 to which negative voltage of the third phase is applied); and a plurality of backflow preventing diodes arranged between the rectifier circuit 2 and the respective smoothing inductors L1, L2, L3, L4, L5, and L6 (backflow preventing diode Dc1 arranged in the electrical circuit to which positive voltage of the first phase is applied; backflow preventing diode Dc2 arranged in the electrical circuit to which positive voltage of the second phase is applied; backflow preventing diode Dc3 arranged in the electrical circuit to which positive voltage of the third phase is applied; backflow preventing diode Dc4 arranged in the electrical circuit to which negative voltage of the first phase is applied; backflow preventing diode Dc5 arranged in the electrical circuit to which negative voltage of the second phase is applied; backflow preventing diode Dc6 arranged in the electrical circuit to which negative voltage of the third phase is applied).

The smoothing capacitors C1 and C2 are charged by the electric current supplied through the smoothing inductors L1, L2, L3, L4, L5 and L6, indicate the DC voltage according to the electric charge thereof, and stabilize the output voltage by supplying the electric current to the inverter circuit 4 by electric discharge.

Herein, the positive output terminal (positive side of smoothing capacitor C1 on positive side) directed to the inverter circuit 4 of the smoothing circuit 3 is defined as point P1, the output terminal (negative side of the smoothing capacitor C2 on the negative side) directed to the inverter circuit 4 of the smoothing circuit 3 is defined as point P2, and the intermediate point of the smoothing capacitors C1, C2 is defined as point P0.

A grounding capacitor Cg produces a voltage difference, with the electric current of the difference in electric current flowing to the smoothing capacitors C1, C2 flowing. In a case of the potential of the intermediate point P0 between the smoothing capacitors C1, C2 being shifted for any reason, it is possible to reduce the difference between the intermediate point P0 and earth potential, using the electrical current difference between the positive-side smoothing capacitor C1 and negative-side smoothing capacitor C2. Compared to the capacity of the smoothing capacitors C1 and C2, the capacity of the grounding capacitor Cg is small; therefore, it becomes possible to simultaneously control the potential of the intermediate point P0, while controlling the potentials (output voltages) of the point P1 and the point P2.

The smoothing inductors L1, L2, L3, L4, L5 and L6 mitigate voltage fluctuation due to turning ON/OFF of the corresponding rectifier switching elements T11, T12, T13, T14, T15 and T16. The smoothing inductors L1, L2, L3, L4, L5 and L6 can be configured by one or a plurality of coils in which a connection including series connection, parallel connection or both is made.

Freewheel diodes Dr1, Dr2, Dr3, Dr4, Dr5 and Dr6 form a closed circuit so as to be able to flow current to the smoothing inductors L1, L2, L3, L4, L5 and L6, in a state turning OFF the rectifier switching elements T11, T12, T13, T14, T15 and T16.

Backflow prevention diodes Dc1, Dc2, Dc3, Dc4, Dc5 and Dc6 prevent the reverse direction voltage from being applied to the rectifier switching elements T11, T12, T13, T14, T15 and T16, when turning OFF the rectifier switching elements T11, T12, T13, T14, T15 and T16, in order to protect the rectifier switching elements T11, T12, T13, T14, T15 and T16 (particularly prevent excessive current from flowing and damaging the parasitic diode thereof).

The inverter circuit 4 has a plurality of inverter switching elements (switching element T21 which outputs first phase positive voltage; switching element T22 which outputs second phase positive voltage; switching element T23 which outputs third phase positive voltage; switching element 124 which outputs first phase negative voltage; switching element T25 which outputs second phase negative voltage; switching element T26 which outputs third phase negative voltage).

The inverter switching elements T21, T22, T23, T24, T25 and T26 can be configured by semiconductor switching elements such as FET.

The control circuit 5 can be established as a configuration having a microprocessor. The control circuit 5 acquires, from a primary power source monitor A1, rectifier circuit current monitor A2, DC link voltage monitor A3 and virtual neutral point voltage monitor A4, the information required for control of the rectifier circuit 2 and inverter circuit 4. It should be noted that, for simplification, illustration of the circuit configurations of the control circuit 5 and respective monitors A1 to A4 are omitted in FIG. 1, and the signal lines between the rectifier circuit 2, smoothing circuit 3 and inverter circuit 4, as well as each monitor A1 to A4 and the control circuit 5 necessitated for control, e.g., the signal lines, etc. for controlling the rectifier switching elements T11, T12, T13, T14, T15 and T16, and inverter switching elements T21, T22, T23, T24, T25 and T26, are shown collectively as a single line having arrows between the rectifier circuit 2, smoothing circuit 3 and inverter circuit 4, and control circuit 5.

The control circuit 5 controls the switching of the rectifier switching element T11, T12, T13, T14, T15 and T16 so that the output voltage of the smoothing circuit 3 (potential between point P1 and point P2) becomes the desired voltage, i.e. twice the peak value of the output voltage of the power supply 1 required (output voltage of inverter circuit 4) The output voltage of the smoothing circuit 3 can be adjusted according to PWM (Pulse Width Modulation) control which turns ON/OFF the rectifier switching elements T11, T12, T13, T14, T15 and T16 in a short cycle to control the length of the time for which turning ON.

At the same time, the control circuit 5 separately controls the switching of the rectifier switching elements T11, T12, T13, T14, T15 and T16 so that the current flowing to each phase of the rectifier circuit becomes the desired current.

Furthermore, the control circuit 5 adjusts the switching of the rectifier switching elements T11, T12, T13, T14, T15 and T16, so that the potential of the intermediate point P0 of the smoothing capacitors C1, C2 becomes a predetermined potential or a potential within a predetermined range, e.g., becomes equal to the earth potential. By making the current flowing to the positive-side rectifier switching elements T11, T12, T13 and the negative-side rectifier switching elements T14, T15, T16 equal, the potential of the intermediate point P0 of the smoothing capacitors C1, C2 becomes almost the earth potential. However, the potential of the intermediate point P0 does not necessarily become the earth potential, due to variation in the input voltage, variation in the operation of the rectifier switching elements T11, T12, T13, T14, T15 and T16, and the leakage current flowing to earth caused by stray capacitance of the load circuit (motor M). In addition, with a voltage decline of the primary power source S or a phase having voltage decrease, in a case of the input voltage becoming no more than equivalent to the voltage of the smoothing capacitors C1, C2, the current cannot flow to the smoothing circuit 3, which becomes a cause of the neutral point potential of three-phase alternating current outputted to the motor M shifting relative to the earth potential. In such a case, the potential of the intermediate point P0 of the smoothing capacitors C1, C2 can be adjusted by providing a difference between the length of time for which turning ON the rectifier switching elements T12, T13, T13 on the positive side and the length of time for which turning on the rectifier switching elements T14, T15, T16 on the negative side, and providing a difference in electrical current flowing to the smoothing capacitors C1, C2.

Figure 2:
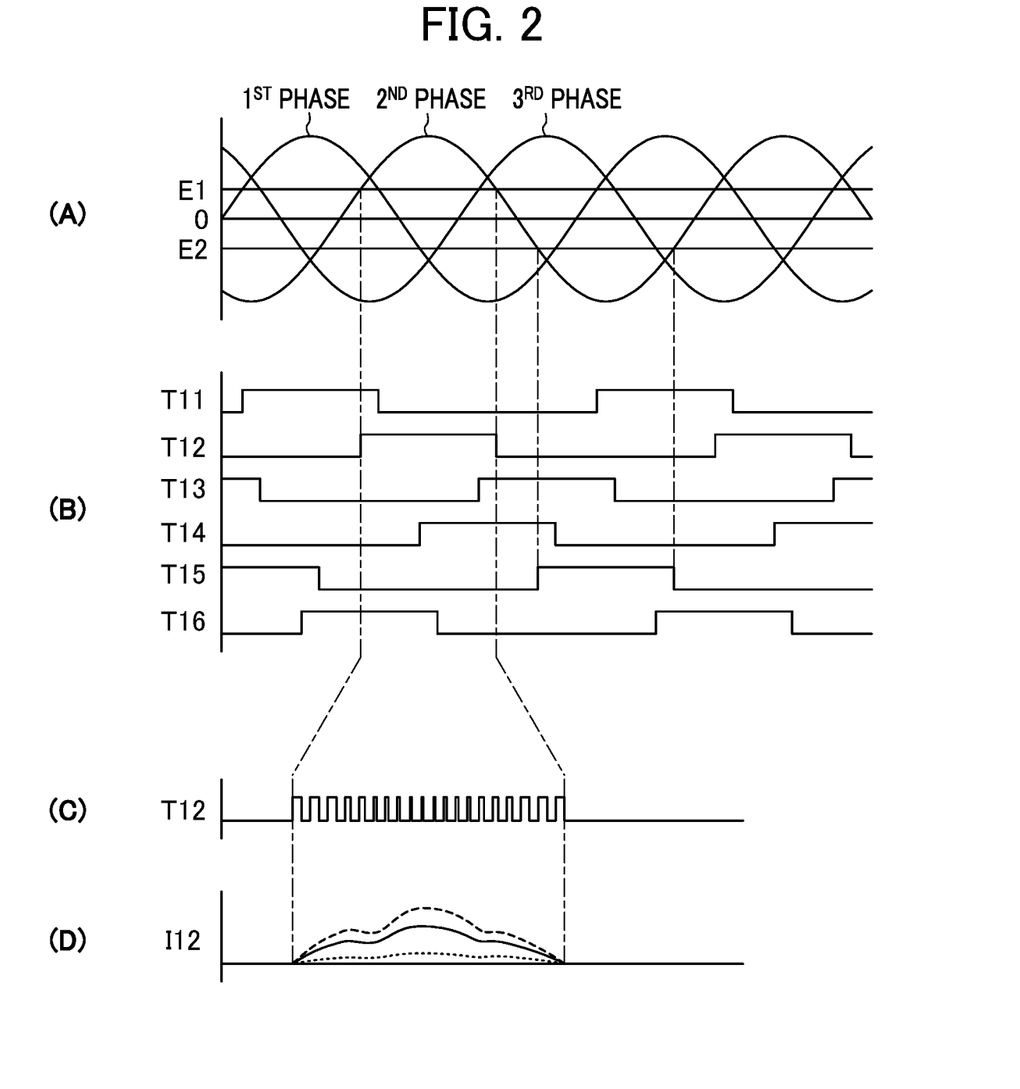
FIG. 2 is a timing chart showing an operating pattern of a rectifier switching element in the power supply of FIG. 1.

FIG. 2 shows an operation pattern of rectifier switching elements T11, T12, T13, T14, T15, and T16 in the power supply 1. FIG. 2(A) shows the voltage waveform of each phase of a primary power source S, and the positive and negative output potential of the power supply 1, i.e. the potential E1 of point P1 and potential E2 of point P2.

FIG. 2(B) shows the interval at which the voltage of each phase can be retrieved from the primary power source S (hereinafter may be referred as PWM control interval) for each of the rectifier switching elements T11, T12, T13, T14, T15 and T16. By the rectifier switching elements T11, T12, T13, T14, T15 and T16 turning ON in the case of the absolute value for the voltage of each phase being at least, the absolute value for the corresponding potential E1 of point P1 or the potential P2 of point P2, it is possible to retrieve the voltage of each phase. Conversely, the control circuit 5 does not turn ON the rectifier switching elements T11, T12, T13, T14, T15 and T16 other than in the interval shown in FIG. 2(B).

The rectifier switching elements T11, T12, T13, T14, T15 and T16 adjust the current supplied to the smoothing capacitors C1, C2 by way of PWM control which turns ON/OFF in a short cycle within. the interval shown in FIG. 2(B) to regulate the time turning ON, and maintains at a desired value the potential E1 of point P1 and potential P2 of point P2 which are proportional to the charging amount of the smoothing capacitors C1, C2. As a specific example, FIG. 2(C) shows an example of PWM control of the positive rectifier switching element T12 of the second phase. In this way, when the phase voltage of the primary power source S is high, it is preferable to make the time for which turning ON the rectifier switching element T12 (pulse width) smaller. It is thereby possible to suppress electrical current flow through the rectifier switching element T12 (corresponding phase of rectifier circuit 2) when the phase voltage of the primary power source S is high, and reduce the fluctuation. in the current value (I12) in the PWM control interval, as shown in FIG. 2(D). In addition, by varying the sum total of the time for which turning ON the rectifier switching element T12 in the PWM control interval, it is possible to regulate the pulse height of electrical current, as show by the dotted line in FIG. 2(D).

At this time, in order to suppress a power factor decline, it is preferable to control the ON time of the rectifier switching elements T11, T12, T13, T14, T15 and T16 so that electrical current of the primary power source flows so as to be as proportional as possible to the voltage of the primary power source. When the output voltage of the power supply 1 (potential difference between point P1 and point P2) increases relative to the input voltage, PWM control is stopped since it is no longer possible to charge the smoothing capacitors C1, C2 (configured so as not to turn ON the rectifier switching elements T11, T12, T13, T14, T15 and T16). The same matter occurs even if the voltage of the primary power source S declines relative to the output voltage of the power supply 1. The power factor deteriorates when the PWM control stop time gets longer. In order to improve this, it is possible to lengthen the PWM control interval by permitting fluctuation in the neutral point potential, in a case of the interphase voltage of the primary power supply S, not the voltage to ground. of the primary power supply S, being greater than the output voltage (potential difference between point P1 and point P2). Under a condition limiting the fluctuation of the neutral point potential to with a fixed range at this time, it becomes possible to lengthen the PWM control interval, and further enhance the power factor improvement and/or peak current suppression.

In other words, there is a tradeoff between the PWM control interval and the fluctuation range of the neutral point potential, and by permitting a certain extent of fluctuation in neutral point potential, not simply fixing the neutral point potential to the earth potential, optimal control according to the purpose becomes possible. The controllability can be improved as the difference between the voltage of the primary power source S and output voltage increases. As an example, in a case of the voltage of the primary power source S being 380 V AC to 480 V AC, and the rated voltage of the motor being 200 V AC, there is an approximately two times voltage difference between the primary power source voltage and the output voltage, the PWM control interval thereby lengthens, and there is an advantage of controllability being improvable.

In addition, since the smoothing circuit 3 has the smoothing inductors L1, L2, L3, L4, L5 and L6, it is possible to limit the electrical current charging the smoothing capacitors C1, C2 relative to the voltage applied per each short time by the rectifier switching elements T11, T12, T13, T14, T15 and T16, respectively, and stabilize the output voltage of the smoothing circuit 3.

In addition, the smoothing circuit 3 has the freewheel diodes Dr1, Dr2, Dr3, Dr4, Dr5 and Dr6; therefore, since it is possible to continuously flow electrical current to the smoothing inductors L1, L2, L3, L4, L5 and L5 even after turning OFF the rectifier switching elements T11, T12, T13, T14, T15 and T16, it is possible to suppress unwanted surge voltage, and further stabilize the output voltage of the smoothing circuit 3.

In the adjustment of the potential of the intermediate point P0 of these smoothing capacitors C1, C2, the ON time ratio of PWM control of the positive-side rectifier switching elements T11, T12, T13 and the negative-side rectifier switching elements T14, T15, T16 may be decreased or increased, or one may be decreased and the other increased. The smoothing capacitors C1, C2 employ high capacity capacitors, and the grounding capacitor Cg employs a small capacity capacitor; therefore, the difference between the electrical current flowing in the rectifier switching elements T11, T12 and T13 and the electrical current flowing in the rectifier switching elements T14, T15 and T16 is very small compared to the overall electrical current, and there is almost no influence such that the output voltage of the smoothing circuit 3 would fluctuate due to control of this neutral point potential.

In the above way, the power supply 1 can voltage transform without using a transformer, and the potential of the neutral point can be set to a predetermined voltage to output alternating current of any frequency.

In detail, according to the power supply 1, it is possible to adjust the output voltage of the smoothing circuit 3, and consequently the output voltage of the inverter circuit 4, by controlling the ON time ratio of PWM control for the rectifier switching elements T11, T12, T13, T14, T15 and T16. In the case of the outputs of each phase of the rectifier circuit 2 not being independent, the power factor will decline due to electrical current flowing only for the phase having the largest phase voltage, and the PWM control interval becoming shorter. The power supply 1, by comparing the phase voltage of each phase and the output voltage, and performing PWM control in the case of the phase voltage being higher, becomes able to flow electrical current even to a phase having a phase voltage which is relatively small. As a result thereof, since lengthening the PWM control interval of each phase becomes possible, an improvement in power factor and suppression of peak current become possible. In addition, in the case of the output current to the inverter circuit increasing and the output voltage of the rectifier circuit 2 declining, the PWM control interval will lengthen, and the power factor will further improve. In the case of the output current to the inverse conversion circuit decreasing and the output voltage of the rectifier circuit 2 rising, although the PWM control interval will shorten, the influence of a power factor decline will be small due to the output current declining. In this way, when lengthening the PWM control interval as much as possible for every phase, it becomes possible to make the electrical current of the rectifier circuit 2 approach a more ideal state.

In addition, since the smoothing circuit 3 has the pair of smoothing capacitors C1, C2 connected in series, the potential of the intermediate paint P0 of the pair of smoothing capacitors C1, C2 will vary according to the difference in voltage charging the pair of smoothing capacitors C1, C2. For this reason, the positive/negative output voltages of the smoothing circuit 3 become equal by controlling the rectifier switching elements T11, T12, T13, T14, T15 and T16 by way of the control circuit 5 so that the potential of the intermediate point P0 of the pair of smoothing capacitors C1, C2 becomes equal to a predetermined potential, e.g., earth potential. The potential of the neutral point of the output voltage obtained by converting the output voltage of the smoothing circuit to AC voltage in the inverter circuit 4 is thereby maintained at a potential equal to the earth potential. Therefore, the power supply 1 according to the present invention can voltage transform without using a transformer, and it is possible to set the potential of the neutral point at a predetermined voltage to output alternating current of any frequency.

The control circuit 5 controls the electrical current flowing in each phase of the rectifier circuit 2, so as to improve the stability of the output voltage of the rectifier circuit 2, stability of the neutral point potential and power factor of each phase, or suppress the peak current. The capacity, dielectric strength, etc. required in each constituent element of the power supply 1 are relatively small, and thus it is possible to reduce the equipment cost, reduce the risk of malfunction due to switching noise, and further, a reduction in equipment electrical power capacity becomes possible.

The power supply 1 adjusts the ON time ratio of PWM control for switching the rectifier switching elements T11, T12, T13, T14, T15 and T16 so that the charging electrical currents of the pair of smoothing capacitors C1, C2 become equal. It is thereby possible to make the potentials of the pair of smoothing capacitors C1, C2 equal.

In the power supply 1, the smoothing circuit has the plurality of smoothing inductors L1, L2, L3, L4, L5 and L6 respectively arranged between the output of each phase positive/negative of the rectifier circuit 2 and the smoothing capacitors C1, C2. It is thereby possible to further stabilize the output voltage of the smoothing circuit 3, by suppressing the fluctuation in charging electrical current of the smoothing capacitors C1, C2.

Figure 3:
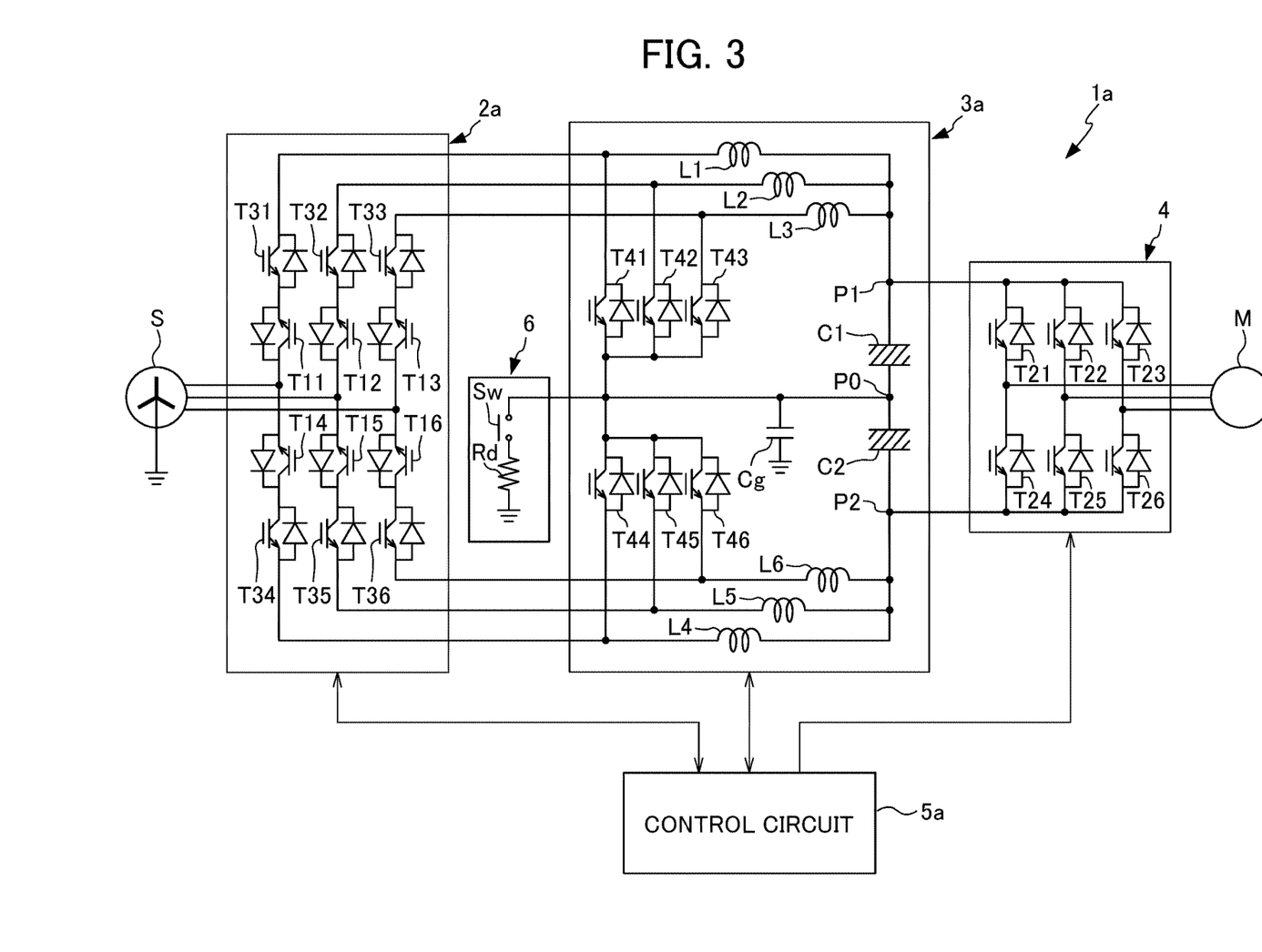
FIG. 3 is a circuit diagram showing the configuration of a power supply according to a different embodiment from that of FIG. 1 of the present invention.

FIG. 3 is a circuit diagram showing the configuration of the power supply 1a according to a different embodiment from FIG. 1 of the present invention. For the power supply 1a in FIG. 3, the same reference symbols are attached to constituent elements which are the same as the power supply 1 in FIG. 1, and redundant explanations will be omitted.

The power supply 1a is a device which converts the three-phase alternating current provided from the primary power source S into three-phase alternating current of different voltage and frequency, and supplies this to the motor M (power running). In addition, the power supply 1a uses the motor M as a generator, whereby regenerative running is possible which converts the electric power outputted by the motor M into synchronized electric power having the same voltage and frequency as the primary power source S, and supplies to the primary power source S.

The power supply 1a includes: a rectifier circuit 2a which separately extracts positive voltage and negative voltage for every phase from the primary power source; a smoothing circuit 3a which obtains stable direct current by smoothing electrical current supplied from the rectifier circuit 2a; an inverter circuit 4 which outputs alternating current of a desired frequency by inverting the output of the smoothing circuit 3a to alternating current; an insulation deterioration detecting circuit 6 for detecting abnormality in the motor M; and a control circuit 5a which controls the rectifier circuit 2a, smoothing circuit 3a, inverter circuit 4 and insulation deterioration detecting circuit 6. In FIG. 3, various monitors which acquire the required information for the control of the control circuit 5a are omitted.

The rectifier circuit 2a includes: the plurality of rectifier switching elements T11, T12, T13, T14, T15 and T16; and a plurality of regenerative switching elements (regenerative switching element T31 arranged in series with the rectifier switching element T11; regenerative switching element T32 arranged in series with the rectifier switching element T12; regenerative switching element T33 arranged in series with the rectifier switching element T13; regenerative switching element T34 arranged in series with the rectifier switching element T14; regenerative switching element T35 arranged in series with the rectifier switching element T15; regenerative switching element T36 arranged in series with the rectifier switching element T16) which are provided corresponding to the rectifier switching elements T11, T12, T13, T14, T15 and T16 and can flow electrical current in the opposite direction.

The regenerative switching elements T31, T32, T33, T34, T35 and T36 can be configured by semiconductor switching elements.

In the present embodiment, the rectifier switching elements T11, T12, T13, T14, T15 and T16 and the regenerative switching elements T31, T32, T33, T34, T35 and T36 are configured by FET having parasitic diodes which flow electrical current in the opposite direction, respectively. For this reason, by connecting the rectifier switching elements T11, T12, T13, T14, T15 and T16 and the regenerative switching elements T31, T32, T44, T45, T35 and T36 in series, it is possible to flow electrical current in one direction when turning ON one of the rectifier switching elements T11, T12, T13, T14, T15 and T16 or the regenerative switching elements T31, T32, T33, T34, T35 and T36. In the case of using a switching element not having a parasitic diode, diodes may be respectively provided in parallel to the rectifier switching elements T11, T12, T13, T14, T15 and T16 and the regenerative switching elements T31, T32, T33, T34, T35 and T36, and the rectifier switching elements T11, T12, T13, T14, T15 and T16 and the regenerative switching elements T31, T32, T33, T34, T35 and T36 may be connected in parallel.

The smoothing circuit 3a includes: a pair of smoothing capacitors connected in series to each other to be charged by the rectifier circuit 2a (smoothing capacitor C1 charged by positive voltage; smoothing capacitor C2 charged by negative voltage); a grounding capacitor Cg which grounds the intermediate point of the pair of smoothing capacitors; a plurality of smoothing inductors respectively arranged between output of each phase positive and negative of the rectifier circuit 2 and the smoothing capacitor (smoothing inductor L1 to which positive voltage of the first phase is applied; smoothing inductor L2 to which positive voltage of the second phase is applied; smoothing inductor L3 to which positive voltage of the third phase is applied; smoothing inductor L4 to which negative voltage of the first phase is applied; smoothing inductor L5 to which negative voltage of the second phase is applied; smoothing inductor 16 to which negative voltage of the third phase is applied); and a plurality of boosting switching elements respectively arranged between the side of the rectifier circuit 2a of the smoothing inductors L1, L2, L3, L4, L5, L6 and the intermediate point P0 of the smoothing capacitors C1, C2 (boosting switching element T41 connected to the smoothing inductor L1; boosting switching element T42 connected to the smoothing inductor L2; boosting switching element T43 connected to the smoothing inductor L3; boosting switching element T44 connected to the smoothing inductor L4; boosting switching element T45 connected to the smoothing inductor L5; boosting switching element T46 connected to the smoothing inductor L6).

The boosting switching elements T41, T42, T43, T44, T45 and T46 can be configured by semiconductor switching elements. In the present embodiment, the boosting switching elements T41, T42, T43, T44, T45 and T46 are configured by FET having parasitic diodes, and this parasitic diode performs a function as a freewheel diode which continuously flows electrical current to the smoothing inductors L1, L2, L3, L4, L5 and L6, even after turning OFF the rectifier switching elements T11, T12, T13, T14, T15 and T16.

The inverter circuit 4 has a plurality of inverter switching elements T21, T22, T23, T24, T25 and T26. The inverter circuit is configured so as to be able to convert the AC voltage supplied from the output side into DC voltage. More specifically, by configuring the inverter switching elements T21, T22, T23, T24, T25 and T26 by PET having parasitic diodes, it is possible to convert the alternating current supplied from the motor M into direct current and charge the smoothing capacitors C1, C2 of the smoothing circuit 3a.

The insulation deterioration detecting circuit 6 includes a detection switch Sw and detection resistor Rd connected in series, and is configured to so as to ground the intermediate point P0 of the pair of smoothing capacitors C1, C2 via this detection switch Sw and detection resistor Rd.

Other than a semiconductor switching element, the detection switch Sw may be configured by a relay or the like due to operating speed not being required, or may be configured by a switch which the operator manipulates by initiative.

The detection resistor Rd is a resistor which causes a potential difference to be produced between both ends when electrical current is flowed, and enables detection of an event of electrical current flowing.

The control circuit 5a of the power supply 1a in FIG. 3 can perform control for performing regenerative running as explained below, in addition to control for performing powered running similarly to the control circuit 5 of the power supply 1 in FIG. 1.

The control circuit 5a controls the boosting switching elements T41, T42, T43, T41, T45 and T46 so that the voltage supplied from the smoothing circuit 3a to the rectifier circuit 2a becomes equal to the voltage peak value on the primary side of the rectifier circuit 2a. In other words, the smoothing circuit 3a has a function as a boost chopper which applies higher voltage than the voltage of the smoothing capacitors C1, V2 to the regenerative switching elements T31, T32, T33, T34, T35 and T36 by accumulating energy in the smoothing inductors L1, L2, L3, L4, L5 and L6 by turning ON the boosting switching elements L41, L42, L43, L44, L45 and L46.

The control circuit 5a controls the regenerative switching elements T31, T32, T33, T34, T35 and T36 so as to extract the voltage synchronized to the primary power source S from the voltage of the smoothing circuit 3a, and supply this to the primary power source.

In the above way, the power supply 1A can voltage transform without using a transformer, and can set the potential of the neutral point to a predetermined voltage and output alternating current of any frequency, as well as being able to perform regenerative running which uses the motor M as a generator and supplies electric power to the primary power source S.

In detail, the rectifier circuit 2a of the power supply 1a has the plurality of regenerative switching elements T31, T32, T33, T34, T35 and T36 which are provided to correspond to the rectifier switching elements T11, T12, T13, T14, T15 and T16 and can flow electrical current in the opposite direction. The smoothing circuit 3a has the plurality of boosting switching elements T41, T42, T43, T44, T45 and 146 respectively arranged between the side of the rectifier circuit 2a of the smoothing inductor and. the intermediate point of the pair of smoothing capacitors C1, C2. The inverter circuit 4 configured to be able to convert the AC voltage supplied from the output side into DC voltage. The control circuit 5a controls the boosting switching elements T41, T42, T43, T44, T45 and T46 so that the voltage supplied. from the smoothing circuit 3a to the rectifier circuit 2a becomes equal to the voltage peak value of the primary power source S, and controls the regenerative switching elements T31, T32, T33, T34, T35 and T36 so as to extract voltage synchronous to the primary power source S from the voltage of the smoothing circuit 3a and supply this to the primary power source S. Since it is thereby possible to boost the voltage of the pair of smoothing capacitors C1, C2 by the smoothing inductors L1, L2, L3, L4, L5 and LT6 and the regenerative switching elements T31, T32, T33, T34, T35 and T36 and supply to the rectifier circuit 2a, regenerative running which uses the motor M connected to the output side of the inverse-conversion circuit 4 as a generator and supplies electric power to the primary power source S can be performed.

The power supply 1a includes the insulation deterioration detecting circuit 6 which grounds the intermediate point of the pair of smoothing capacitors C1, C2 via the detection switch Sw and detection resistor Rd. It is thereby possible to detect malfunctions such as a ground fault or insulation deterioration of the load connected to the output side of the inverter circuit 4, by turning ON only any one of the inverter switching elements T21, T22, T23, T24, T25 and T26.

Figure 4:
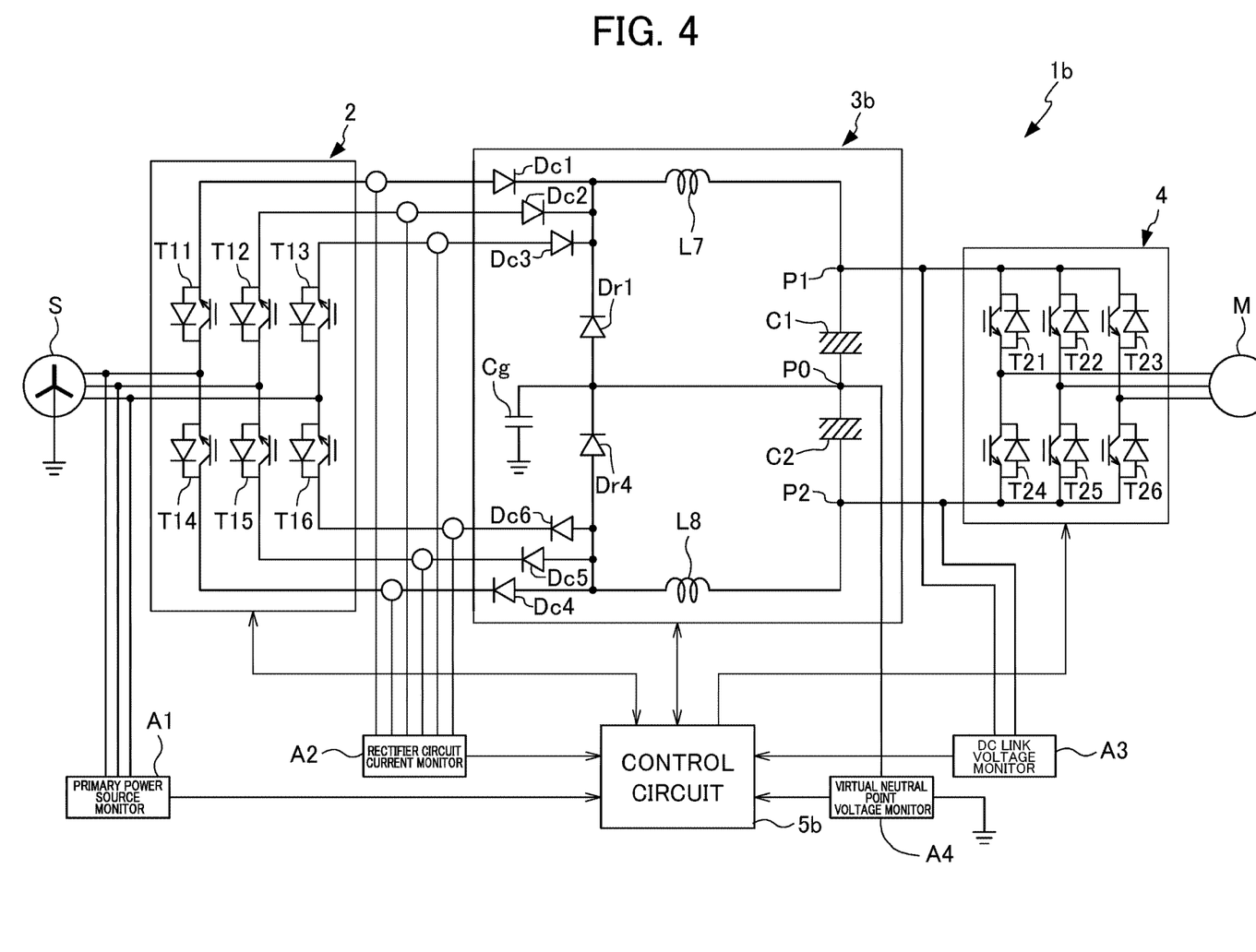
FIG. 4 is a circuit diagram showing the configuration of a power supply according to a different embodiment from those of FIGS. 1 and 3 of the present invention.

FIG. 4 is a circuit diagram showing the configuration of a power supply 1b according to a different embodiment than FIG. 1 and FIG. 3 of the present invention. The power supply 1b in FIG. 4 includes: the rectifier circuit 2 which separately extracts the positive voltage and negative voltage for every phase from the primary power source S; the smoothing circuit 3b which obtains stable direct current by smoothing the electrical current supplied from the rectifier circuit 2; the inverter circuit 4 which outputs alternating current of the desired frequency by inverting the output of the smoothing circuit 3b to alternating current; and the control circuit 5b which controls the rectifier circuit 2, smoothing circuit 3b and inverter circuit 4.

The smoothing circuit 3b of the power supply 1b in FIG. 4 is made by providing a single smoothing inductor L7 in place of the positive smoothing inductors L1, L2, and L3, and providing a single smoothing inductor L8 in place of the negative smoothing inductors L4, L5 and L6 of the smoothing circuit 3 of the power supply 1 in FIG. 1. For this reason, for the power supply 1b in FIG. 4, the same reference symbols will be attached to constituent elements that are the same as the power supply 1 in FIG. 1, and redundant explanations will be omitted.

The smoothing circuit 3b is configured so as to combine into one the outputs of each positive phase of the rectifier circuit 2 and supply electrical current to the positive smoothing capacitor C1 via the smoothing inductor L7, and combine into one the outputs of each negative phase of the rectifier circuit 2 and supply electrical current to the negative smoothing capacitor C2 via the smoothing inductor L8.

In the power supply 1b of FIG. 4, the control circuit 5b may control the rectifier switching elements T11, T12, T13, T14, T15 and T16 of the rectifier circuit 2, similarly to the power supply 1 in FIG. 1. In this case, although the rectifier switching elements T11, T12, T13, T14, T15 and T16 of the plurality of phases may be turned ON simultaneously, electrical current will flow only to the phase having a large absolute value of potential. In addition, in the power supply 1b of FIG. 4, the control circuit 5b may turn ON any one of the positive rectifier switching elements T11, T12 and T13 of the rectifier circuit 2 so as to extract the voltage of a phase having the highest potential among the respective phases of the primary power source S, and turn ON any one of the negative rectifier switching elements T14, T15 and T16 of the rectifier circuit 2 so as to extract the voltage of the phase having the lowest potential. in addition, the control circuit 5b may control the rectifier switching elements T11, T12, T13, T14, T15 and T16 so as to alternately turn ON in one cycle of PWM control the phase for which the absolute value of potential is larger than the absolute value of the potentials E1, E2 of the points P1, P2, among the respective phases of the primary power source S.

Since the power supply 1b in FIG. 4 has a small number of components, a size reduction and cost reduction of the device are possible.

Figure 5:
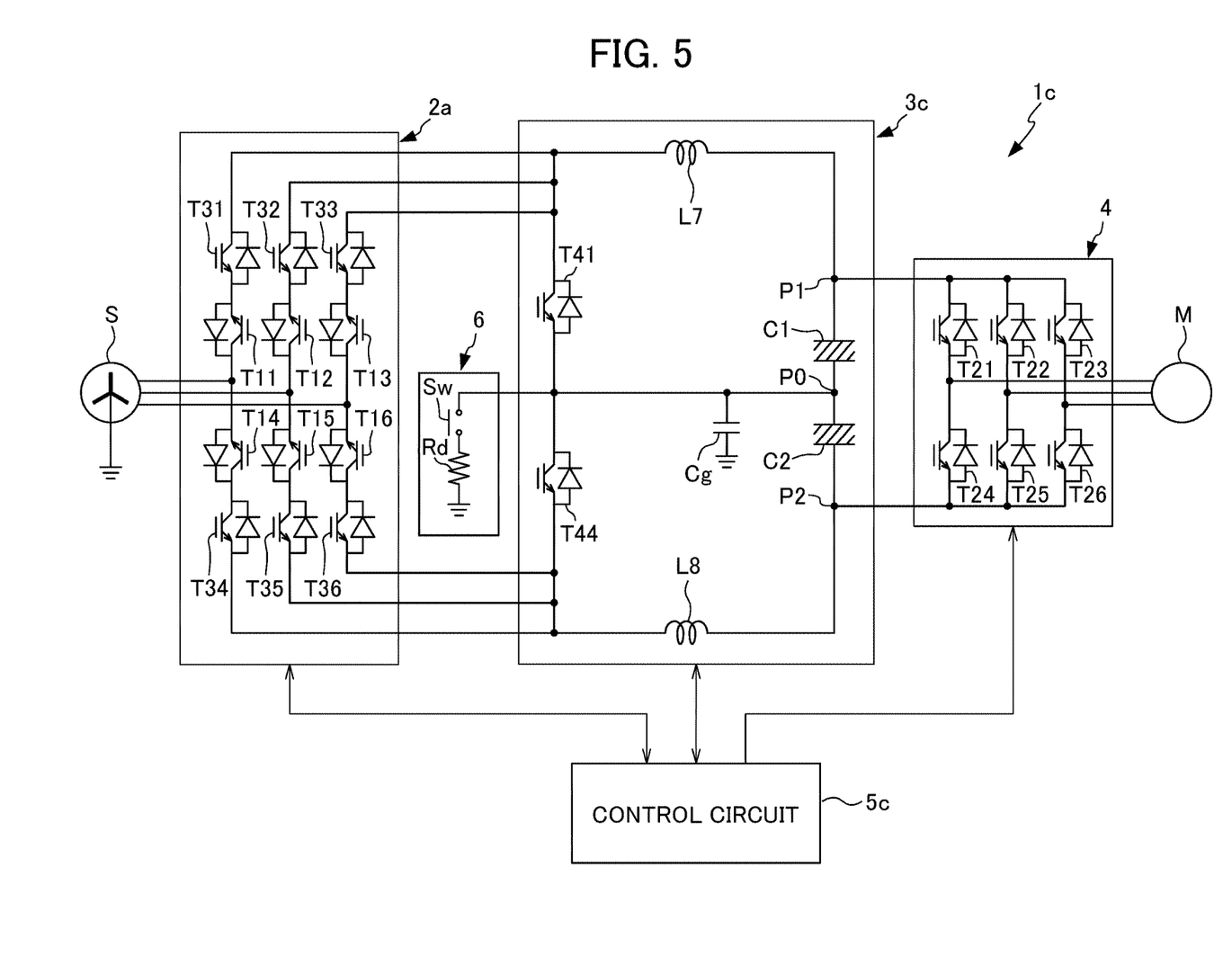
FIG. 5 is a circuit diagram showing the configuration of a power supply according to a different embodiment from those of FIGS. 1, 3 and 4 of the present invention.

FIG. 5 is a circuit diagram showing the configuration of a power supply 1c according to a different embodiment, than FIGS. 1, 3 and 4. The power supply 1c includes: the rectifier circuit 2a which separately extracts the positive voltage and negative voltage for every phase from the primary power source; the smoothing circuit 3c which obtains stable direct current by smoothing the electrical current supplied from the rectifier circuit 2a; the inverter circuit 4 which outputs alternating current of the desired frequency by inverting the output of the smoothing circuit 3a to alternating current; the insulation deterioration detecting circuit 6 for detecting abnormality of the motor M; and the control circuit 5c which controls the rectifier circuit 2a, smoothing circuit 3c, inverter circuit 4 and insulation deterioration. detecting circuit 6.

The smoothing circuit 3c of the power supply 1c in FIG. 5 is made by providing a single smoothing inductor L7 in place of the positive smoothing inductors L1, L2 and L3, and providing a single smoothing inductor L8 in place of the negative smoothing inductors L4, L5 and L6 of the smoothing circuit 3a of the power supply 1a in FIG. 2. For this reason, for the power supply 1c in FIG. 5, the same reference symbols are attached to constituent elements which are the same as the power supply 1a in FIG. 2, and redundant explanations will be omitted.

The control circuit 5c of the power supply 1c in FIG. 5 can control the rectifier switching elements T11, T12, T13, T14, T15 and T16 of the rectifier circuit 2a, similarly to how the control circuit 5b of the power supply 1b in FIG. 4 controls the rectifier switching elements T11, T12, T13, T14, T15 and T16 of the rectifier circuit 2.

Although embodiments of the present invention have been. explained above, the present invention is not to be limited to the aforementioned embodiments. In addition, the effects described in the present embodiment are merely listing the most preferred effects produced from the present invention, and the effects according to the present invention are not to be limited to those described in the present embodiment.

In the power supply according to the present invention, the insulation deterioration detecting circuit is any configuration, and the insulation deterioration detecting circuit can be provided also in the case of not having a regenerating function.

In the power supply according to the present invention, the control circuit can perform PWM control of the switching elements of the rectifier circuit so as to set the voltage of the pair of smoothing capacitors to a predetermined voltage, set the potential of the intermediate point of the pair of smoothing capacitors to a predetermined potential, and set the electrical current flowing to the rectifier circuit to a predetermined electrical current. It thereby becomes possible to convert the voltage at the load, and further improve the power factor of input current, and suppress peak current, since maintaining the neutral point potential at a predetermined potential, without using a transformer.

EXPLANATION OF REFERENCE NUMERALS

1, 1a, 1b, 1c power supply
2, 2a rectifier circuit
3, 3a, 3b, 3c smoothing circuit
4 inverter circuit
5, 5a, 5b, 5c control circuit
6 insulation deterioration detecting circuit
C1, C2 smoothing capacitor
Cg grounding capacitor
L1, L2, L3, L4, L5, L6, L7, L8 smoothing inductor
S primary power source
T11, T12, T13, T14, T15, T16 rectifier switching element
T21, T22, T23, T24, T25, T26 inverter switching element
T31, T32, T33, T34, T35, T36 regenerative switching element
T41, T42, T43, T44, T45, T46 boosting switching element

What is claimed is:

1. A power supply comprising:
   a rectifier circuit which has a plurality of rectifier switching elements, and separately extracts a positive voltage and a negative voltage for every phase from a primary power source of three-phase alternating current, respectively;
   a smoothing circuit which has a pair of smoothing capacitors connected in series to each other to be charged by the rectifier circuit, and a plurality of smoothing inductors respectively arranged between the rectifier circuit and the smoothing capacitors;
   an inverter circuit which has a plurality of inverter switching elements and inverts output of the smoothing circuit into alternating current; and
   a control circuit which controls switching of the plurality of rectifier switching elements so that output voltage of the smoothing circuit becomes a desired voltage, and electrical current flowing to each phase of the rectifier circuit becomes a desired electrical current.

2. The power supply according to claim 1, wherein the smoothing inductors are respectively arranged between positive and negative outputs of each phase of the rectifier circuit and the smoothing capacitor.

3. The power supply according to claim 1, wherein the control circuit controls electrical current flowing to each phase of the rectifier circuit, so that potential of an intermediate point of the pair of smoothing capacitors becomes a predetermined potential or a potential within a predetermined range.

4. The power supply according to claim 1, wherein the control circuit controls electrical current flowing to each phase of the rectifier circuit, so as to improve a power factor of each phase of the rectifier circuit, or suppress peak current.

5. The power supply according to claim 1, wherein the rectifier circuit further includes a plurality of regenerative switching elements provided to correspond to the rectifier switching elements, and which can flow electrical current in an opposite direction, wherein the smoothing circuit further includes a plurality of boosting switching elements which respectively connect a side of the rectifier circuit of the smoothing inductor and an intermediate point of the pair of smoothing capacitors, wherein the inverter circuit is configured so as to be able to convert alternating current voltage supplied from an output side into direct current voltage, and wherein the control circuit controls the boosting switching element so that voltage supplied from the smoothing circuit to the rectifier circuit becomes equal to a voltage peak value of a primary power source, and controls the regenerative switching element so as to extract voltage synchronized with the primary power source from the voltage of the smoothing circuit and supply to the primary power source.

6. The power supply according to claim 1, further comprising an insulation deterioration detecting circuit which grounds the intermediate point of the pair of smoothing capacitors via a detection switch and a detection resistor.

* * * * *